(12) United States Patent
Russell et al.

(10) Patent No.: US 11,934,193 B2
(45) Date of Patent: Mar. 19, 2024

(54) SPEED-DEPENDENT REQUIRED LATERAL CLEARANCE FOR AUTONOMOUS VEHICLE PATH PLANNING

(71) Applicant: Waymo LLC, Mountain View, CA (US)

(72) Inventors: Jared Stephen Russell, San Francisco, CA (US); Mark Paskin, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 499 days.

(21) Appl. No.: 16/855,337

(22) Filed: Apr. 22, 2020

(65) Prior Publication Data

US 2020/0249687 A1 Aug. 6, 2020

Related U.S. Application Data

(63) Continuation of application No. 15/791,623, filed on Oct. 24, 2017, now Pat. No. 10,671,079.

(51) Int. Cl.
| | | |
|---|---|---|
| G05D 1/02 | (2020.01) | |
| G05D 1/00 | (2006.01) | |
| G08G 1/16 | (2006.01) | |

(52) U.S. Cl.
CPC ......... *G05D 1/0223* (2013.01); *G05D 1/0088* (2013.01); *G05D 1/0214* (2013.01);
(Continued)

(58) Field of Classification Search
CPC .. G05D 1/0223; G05D 1/0088; G05D 1/0214; G05D 2201/0213; G08G 1/166;
(Continued)

(56) References Cited

U.S. PATENT DOCUMENTS

| | | |
|---|---|---|
| 8,473,144 B1 | 6/2013 | Dolgov et al. |
| 9,090,259 B2 | 7/2015 | Dolgov et al. |

(Continued)

FOREIGN PATENT DOCUMENTS

| | | |
|---|---|---|
| CN | 103786723 A | 5/2014 |
| CN | 104802795 A | 7/2015 |

(Continued)

OTHER PUBLICATIONS

"International Search Report and Written Opinion for Application No. PCT/US2018/057113, dated Mar. 8, 2019", 9 pages.

(Continued)

*Primary Examiner* — Donald J Wallace
(74) *Attorney, Agent, or Firm* — Botos Churchill IP Law

(57) ABSTRACT

The technology relates to controlling a vehicle in an autonomous driving mode. In one instance, sensor data identifying an object in an environment of the vehicle may be received. A first path of a first trajectory where the vehicle will pass the object may be determined. A function is used to determining a first maximum speed of the vehicle based on a predetermined minimum lateral clearance between the object and the vehicle. The first maximum speed may be used to determine whether an actual lateral clearance between the object and the vehicle will meet the predetermined minimum lateral clearance. The determination of whether the actual lateral clearance will meet the predetermined minimum lateral clearance may be used to generate a first speed plan for the first trajectory. The vehicle may be controlled in the autonomous driving mode according to the first trajectory including the first speed plan and the first path.

22 Claims, 12 Drawing Sheets

(52) U.S. Cl.
CPC ............. *G08G 1/166* (2013.01); *G08G 1/167* (2013.01); *B60W 2520/10* (2013.01); *B60W 2554/00* (2020.02); *B60W 2720/10* (2013.01); *G05D 2201/0213* (2013.01)

(58) Field of Classification Search
CPC ... G08G 1/167; G08G 1/165; B60W 2520/10; B60W 2554/00; B60W 2720/10; B60W 30/09; B60W 2554/20; B60W 2554/402; B60W 2754/20; B60W 2754/30; B60W 30/10; B60W 30/16; B60W 60/0015
See application file for complete search history.

(56) References Cited

U.S. PATENT DOCUMENTS

| | | | |
|---|---|---|---|
| 9,633,564 | B2 | 4/2017 | Ferguson |
| 10,671,079 | B2* | 6/2020 | Russell ................. G08G 1/166 |
| 2010/0217527 | A1 | 8/2010 | Hattori et al. |
| 2013/0024075 | A1 | 1/2013 | Zagorski |
| 2014/0297094 | A1 | 10/2014 | Dolgov |
| 2015/0210279 | A1 | 7/2015 | Agnew et al. |
| 2015/0224987 | A1 | 8/2015 | Tachibana |
| 2016/0231746 | A1 | 8/2016 | Hazelton et al. |
| 2016/0288788 | A1 | 10/2016 | Nagasaka et al. |
| 2017/0101056 | A1 | 4/2017 | Park |
| 2017/0248959 | A1* | 8/2017 | Matsubara ............ B60W 30/00 |
| 2017/0274901 | A1 | 9/2017 | Herbach et al. |
| 2018/0356830 | A1 | 12/2018 | Haghighat |

FOREIGN PATENT DOCUMENTS

| | | |
|---|---|---|
| CN | 104812645 A | 7/2015 |
| CN | 106004876 A | 10/2016 |
| CN | 106926844 A | 7/2017 |
| DE | 102016104250 A1 | 10/2016 |
| EP | 2902290 A1 | 8/2015 |
| EP | 3701348 A1 | 9/2020 |

OTHER PUBLICATIONS

Grob, et al., "Towards Autonomous Robotic Systems", 12th Annual Conference, TAROS, 2011, 2 pages.
Extended European Search Report for Application No. 18869541.5 dated Jul. 9, 2021 (8 pages).
The First Office Action for Chinese Patent Application No. 201880067219.X, dated Dec. 21, 2022.

* cited by examiner

SPEED-DEPENDENT REQUIRED LATERAL CLEARANCE FOR AUTONOMOUS VEHICLE PATH PLANNING

CROSS REFERENCE TO RELATED APPLICATIONS

The present application is a continuation of U.S. application Ser. No. 15/791,623, filed Oct. 24, 2017, the entire disclosure of which is incorporated by reference herein.

BACKGROUND

Autonomous vehicles, for instance vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location, for instance, by periodically determining trajectories for the vehicle to follow in order to reach the location.

BRIEF SUMMARY

One aspect of the disclosure provides a method of controlling a vehicle in an autonomous driving mode. The method includes receiving, by one or more processors, sensor data identifying an object in an environment of the vehicle; determining, by the one or more processors, a first path of a first trajectory where the vehicle will pass the object; using, by the one or more processors, a function to determining a first maximum speed of the vehicle based on a predetermined minimum lateral clearance between the object and the vehicle; determining, by the one or more processors, using the first maximum speed, whether an actual lateral clearance between the object and the vehicle will meet the predetermined minimum lateral clearance; using, by the one or more processors, the determination of whether the actual lateral clearance will meet the predetermined minimum lateral clearance to generate a first speed plan for the first trajectory; and controlling, by the one or more processors, the vehicle in the autonomous driving mode according to the first trajectory including the first speed plan and the first path.

In one example, the sensor data further identifies a type of the object, and wherein the function is identified based on the type of the object. In another example, the function is a linear function where maximum speed increases with minimum lateral clearance, and maximum speed decreases with minimum lateral clearance. In another example, when the actual lateral clearance is determined not meet the predetermined minimum lateral clearance, the first speed plan includes stopping the vehicle to yield to the object. In this example, the method also includes setting a second maximum speed to one of a lower of the first maximum speed or a current speed of the vehicle, determining a new threshold minimum lateral clearance using the function and the second maximum speed, generating a second path for a second trajectory, determining a second speed plan for the second trajectory, controlling the vehicle in the autonomous driving mode according to the second trajectory including the second speed plan and the second path. In addition, the method also includes determining whether a current actual lateral clearance between the object and the vehicle will meet the new threshold minimum lateral clearance, and wherein determining the second speed plan is further based on the determination of whether a current actual lateral clearance will meet the new threshold minimum lateral clearance. As an alternative, the method also includes setting a second maximum speed to one of a lower of the first maximum speed, a threshold absolute minimum passing speed, or a current speed of the vehicle, determining a new threshold minimum lateral clearance using the function and the second maximum speed, generating a second path for a second trajectory, determining a second speed plan for the second trajectory using the new threshold minimum lateral clearance, and controlling the vehicle in the autonomous driving mode according to the second trajectory including the second speed plan and the second path. In addition, the method also includes determining whether a current actual lateral clearance between the object and the vehicle will meet the new threshold minimum lateral clearance, and wherein determining the second speed plan is further based on the determination of whether a current actual lateral clearance will meet the new threshold minimum lateral clearance. In another example, when the actual lateral clearance is determined to meet the predetermined minimum lateral clearance, the first speed plan includes passing the object. In this example, the method also includes determining whether the actual lateral clearance is at least a threshold value greater than the predetermine minimum lateral clearance, when the actual lateral clearance is at least the threshold value greater than the predetermined minimum lateral clearance, setting a second maximum speed by increasing the first maximum speed by a constant value, determining a new threshold minimum lateral clearance using the function and the second maximum speed, generating a second path for a second trajectory, determining a second speed plan for the second trajectory using the new threshold minimum lateral clearance, and controlling the vehicle in the autonomous driving mode according to the second trajectory including the second speed plan and the second path. Alternatively, the method includes determining whether the actual lateral clearance is at least a threshold value greater than the predetermine minimum lateral clearance, when the actual lateral clearance is not at least the threshold value greater than the predetermined minimum lateral clearance, setting a second maximum speed to the first maximum speed value, determining a new threshold minimum lateral clearance using the function and the second maximum speed, generating a second path for a second trajectory, determining a second speed plan for the second trajectory using the new threshold minimum lateral clearance, and controlling the vehicle in the autonomous driving mode according to the second trajectory including the second speed plan and the second path.

Another aspect of the disclosure provides a system for controlling a vehicle in an autonomous driving mode. The system includes one or more processors configured to receive sensor data identifying an object in an environment of the vehicle, determine a first path of a first trajectory where the vehicle will pass the object, use a function to determining a first maximum speed of the vehicle based on a predetermined minimum lateral clearance between the object and the vehicle, determine, using the first maximum speed, whether an actual lateral clearance between the object and the vehicle will meet the predetermined minimum lateral clearance, use the determination of whether the actual lateral clearance will meet the predetermined minimum lateral clearance to generate a first speed plan for the first trajectory, and control the vehicle in the autonomous driving mode according to the first trajectory including the first speed plan and the first path.

In one example, the function is a linear function where maximum speed increases with minimum lateral clearance, and maximum speed decreases with minimum lateral clearance. In another example, when the actual lateral clearance is determined not meet the predetermined minimum lateral clearance, the first speed plan includes stopping the vehicle to yield to the object. In another example, the one or more processors are further configured to set a second maximum speed to one of a lower of the first maximum speed or a current speed of the vehicle, determine a new threshold minimum lateral clearance using the function and the second maximum speed, generate a second path for a second trajectory, determine a second speed plan for the second trajectory using the new threshold minimum lateral clearance, and control the vehicle in the autonomous driving mode according to the second trajectory including the second speed plan and the second path. In this example, the one or more processors are further configured to determine whether a current actual lateral clearance between the object and the vehicle will meet the new threshold minimum lateral clearance, and to determine the second speed plan further based on the determination of whether a current actual lateral clearance will meet the new threshold minimum lateral clearance. Alternatively, the one or more processors are further configured to set a second maximum speed to one of a lower of the first maximum speed, a threshold absolute minimum passing speed, or a current speed of the vehicle, determine a new threshold minimum lateral clearance using the function and the second maximum speed, generate a second path for a second trajectory, determine a second speed plan for the second trajectory using the new threshold minimum lateral clearance, and control the vehicle in the autonomous driving mode according to the second trajectory including the second speed plan and the second path. In this example, the one or more processors are further configured to determine whether a current actual lateral clearance between the object and the vehicle will meet the new threshold minimum lateral clearance, and to determine the second speed plan further based on the determination of whether a current actual lateral clearance will meet the new threshold minimum lateral clearance. In another example, when the actual lateral clearance is determined to meet the predetermined minimum lateral clearance, the first speed plan includes passing the object. In another example, the system also includes the vehicle.

DETAILED DESCRIPTION

Overview

Figure 1:
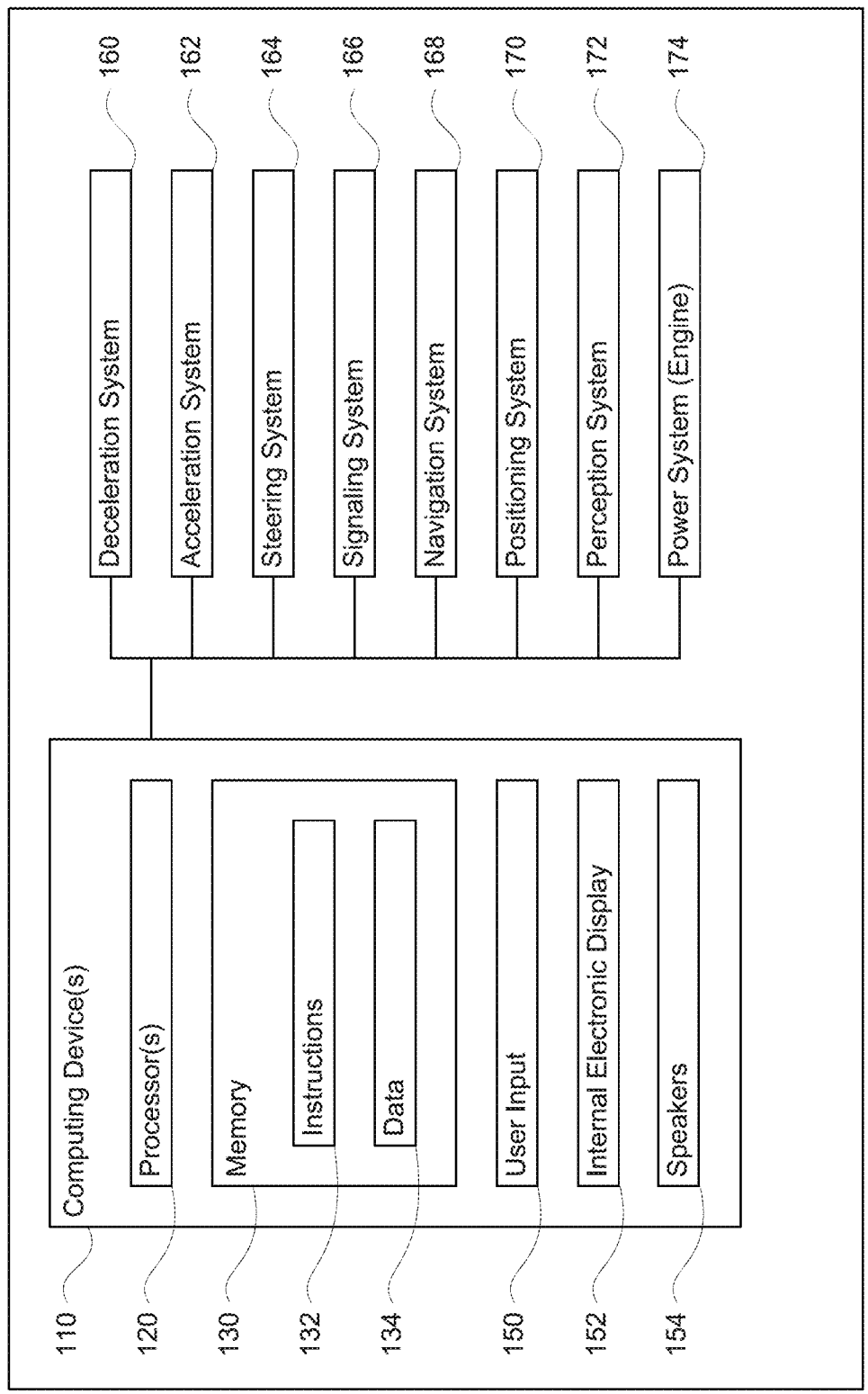
FIG. 1 is a functional diagram of an example vehicle in accordance with aspects of the disclosure.

When planning a trajectory for such vehicles, one approach is to first generate geometry for the "path" of the vehicle and subsequently generate a time and speed parameterization or speed plan for the path. This decomposition of the problem may lead to more tractable optimization problems than solving a joint problem (geometry and speed) all at once.

In some instances, when "passing" another vehicle or object in the environment, the vehicle's computing devices may first attempt to achieve a minimum desired clearance (as a function of an object's type and context, e.g. parked vs. moving cars vs. pedestrians) between the path and the object's current or predicted spatial extents during the geometry optimization phase, and subsequently that the self-driving vehicle comes to a stop before violating this clearance if the vehicle was unable to do so (for example, because of the presence of other constraints during geometry optimization). While this allows the vehicle to stop along the path if an object is in front of the vehicle or proceed if an object is sufficiently far away laterally from the path, it does not provide the vehicle with the ability to proceed more slowly if an object is nearly in the path. This would typically require joint space-time planning. In order to allow an autonomous vehicle to proceed more slowly if an object is nearly in the path without requiring joint space-time planning, a speed dependent minimum lateral clearance to an object may be used. For instance, a function which defines a minimum desired clearance for an object given a maximum speed may be defined.

A path of the trajectory may be determined. This path may define a geometry following a route to a destination. Thereafter a speed plan for the path may be determined.

In order to determine a speed plan, a maximum speed for passing a given object may be determined by using the function and inputting the maximum desired lateral clearance. If the actual clearance of the path is less than the desired minimum lateral clearance, the resulting speed plan will cause the vehicle yield or stop before violating the desired minimum lateral clearance.

In the next iteration, where the vehicle was going to yield or stop in the previous iteration, the maximum speed may be set to the minimum of the previous maximum speed and the vehicle's current speed. Alternatively, a threshold absolute minimum speed representing passing an object extremely slowly may be used. A new desired minimum lateral clearance may be set using the function and inputting the new maximum speed. The computing devices may then generate a new path. Again, if the actual clearance is less than the new desired minimum lateral clearance, the resulting speed plan will cause the vehicle yield or stop before violating the desired minimum lateral clearance.

In the next iteration, if the vehicle was not going to yield or stop in the previous iteration but would be able to pass the object or rather, the actual clearance is greater than the previously required minimum lateral clearance plus some threshold value, the new maximum speed may be determined by increasing the previous maximum speed by a constant.

This constant may be selected such that when the new maximum speed is input into the function, the result is a new minimum lateral clearance that is less than the previously required minimum lateral clearance plus the threshold value. The threshold value and constant chosen influence how quick the vehicle is able to react to a changing situation as well as the smoothness of the vehicle's reaction. If the actual clearance greater than the previously required minimum lateral clearance, but not greater than the previously required minimum lateral clearance plus the threshold value, the vehicle may continue to use the previous maximum speed as the new maximum speed for this iteration.

The new desired minimum clearance for this iteration may then be determined using the function and the new maximum speed. A new path may be determined. Again, if the actual clearance is less than the new desired minimum lateral clearance, the resulting speed plan will cause the vehicle yield or stop before violating the desired minimum lateral clearance.

The iterations may continue until the vehicle has passed the object. The result is that when an object is close to the vehicle's path, the vehicle's computing devices will plan to stop the vehicle, thus slowing down until the vehicle's current speed is appropriate to pass an object given the actual clearance. At this point, the vehicle will continue at that speed unless there is an increase in actual clearance in which case the vehicle's computing devices can slightly and incrementally increase the vehicle's maximum speed using the iterations described above.

The technology described herein may allow distinct geometry and velocity planners/optimizers to implement continuous, smooth, and safe reactions for a variety of objects without explicitly having to solve an overly-complicated space-time optimization problem. In other words, the vehicle is able to obtain reactions to dynamic and static objects in the environment that are spatially and temporally consistent. The vehicle is thus able to stop along a path if an object is in front of the vehicle, proceed if the object is sufficiently far away laterally from the path, and proceed more slowly if the object is nearly in the path, all without requiring a change in in the geometry for the path. In addition, the parameters specified for minimum clearances as a function of speed are extremely intuitive and easy tuned manually or via learning from corpuses of human driving data. In additional to the ease of specifying the speed/gap tradeoffs, this approach also provides simple and intuitive mechanisms for dealing with noise in perception data via the threshold and constants described herein, as they can be naturally derived from the aggregated statistical properties of the object measurement system.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing devices code on the computing device-readable medium. In that regard, the terms "instructions" and "programs" may be used interchangeably herein. The instructions may be stored in object code format for direct processing by the processor, or in any other computing devices language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. The data 134 may include a function which defines a minimum desired lateral clearance for an object given a particular speed of the vehicle 100. This function may be a simple linear function where a maximum speed of the vehicle increases linearly with the minimum desired clearance to the object. In other words, the function may be used to determine speed plan such that as the lateral gap between the object and the vehicle (or the path) decreases, the speed of the vehicle will also decrease. Similarly, as the lateral gap between the object and the vehicle increases, the speed of the vehicle may increase. Alternatively, the function may be more complex, incorporating a collision severity model along with uncertainty information from the perception system. In this example, the function may not be linear, but could be quadratic or a piecewise polynomial of arbitrary order. Because the lateral gap is likely to change, the speed plan may be determined iteratively using the function as discussed further below.

The data 134 may also store minimum lateral clearance values for different types of objects. For instance, different minimum lateral clearance values for different types of objects may be stored in a table, database or other storage system. As an example, different types of objects may include road users (such as vehicles, pedestrians, bicyclists, etc.), road features (such as curbs, barriers, lane lines, sidewalks, crosswalks, signs etc.), and other objects such as debris, vegetation, etc. Each of these objects may have a corresponding minimum lateral clearance value. These values are designed to be "safe and comfortable" for a given object type and nominal speed. These are learned, or tuned manually, based on norms of road users captured through sensor data. In some instances, a default value may be used for objects not specifically identified in the table, certain objects of the table, or all objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing devices having its own processor or central processing unit (CPU), memory, etc. which may interface with the computing devices 110 via a high-bandwidth or other network connection. In some examples, the computing devices may be a user interface computing devices which can communicate with a user's client device. Similarly, the memory may be a hard drive or other storage media located in a housing different from that of computing devices 110. Accordingly, references to a processor or computing devices will be understood to include references to a collection of processors or computing devices or memories that may or may not operate in parallel.

Computing devices 110 may all of the components normally used in connection with a computing devices such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be an autonomous driving computing system incorporated into vehicle 100. The autonomous driving computing system may capable of communicating with various components of the vehicle. For example, returning to FIG. 1, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in an external environment of the vehicle), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, in actuality, these systems may also be incorporated into computing devices 110, again as an autonomous driving computing system for controlling vehicle 100.

The computing devices 110 may control the direction and speed of the vehicle by controlling various components. By way of example, computing devices 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Figure 2:
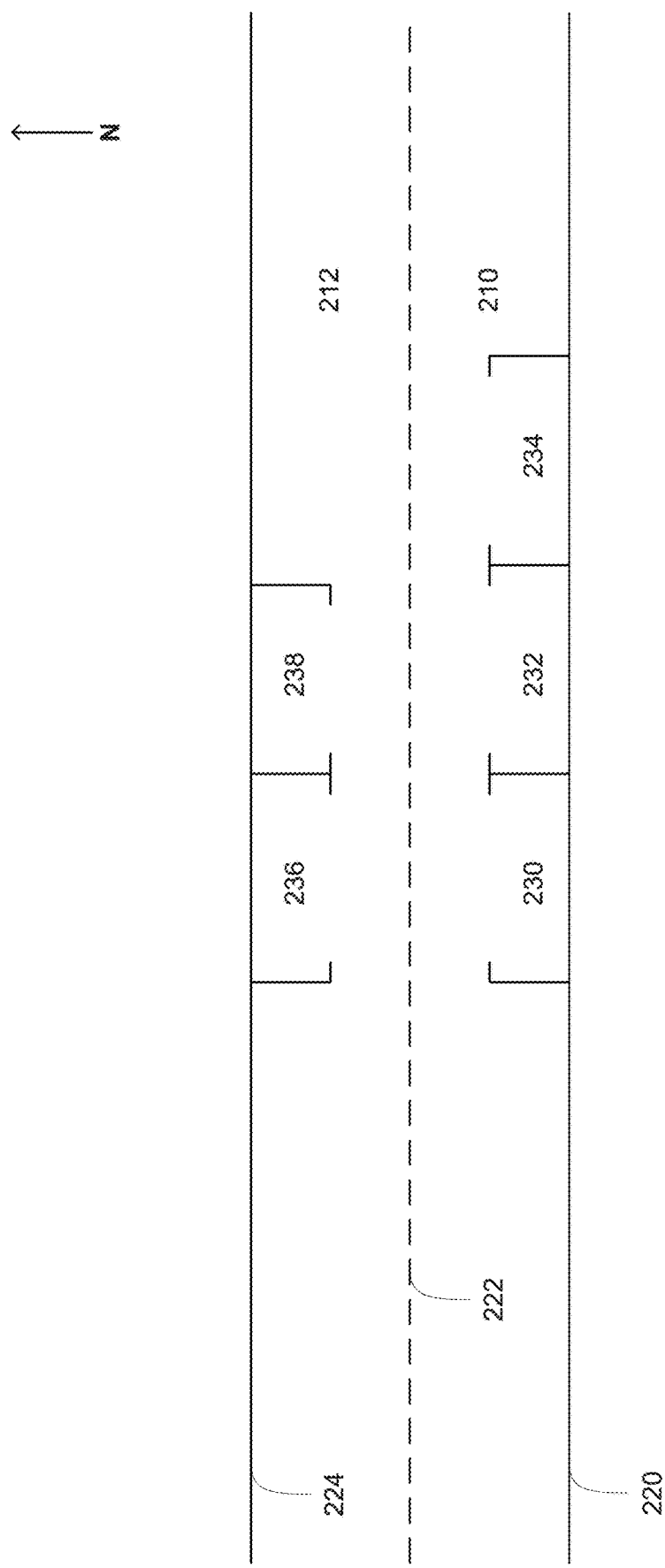
FIG. 2 is an example representation of detailed map information in accordance with aspects of the disclosure.
Figure 3A:
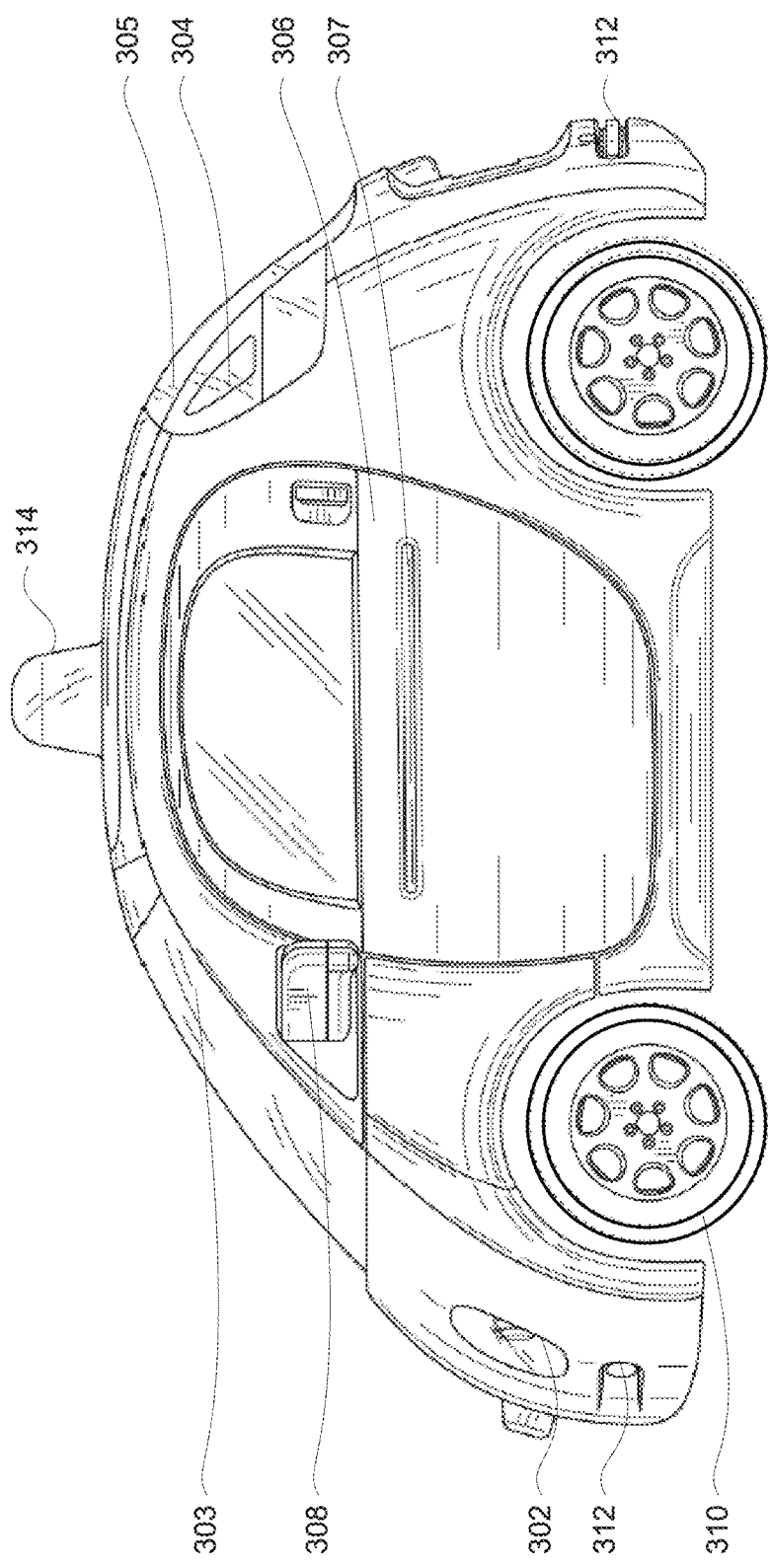
FIGS. 3A-3D are example external views of a vehicle in accordance with aspects of the disclosure.
Figure 3C:
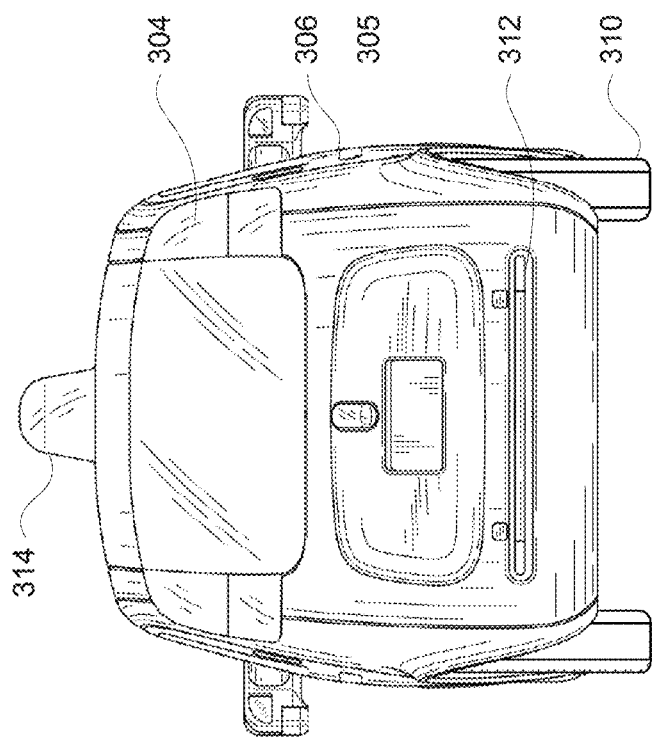
Figure 3B:
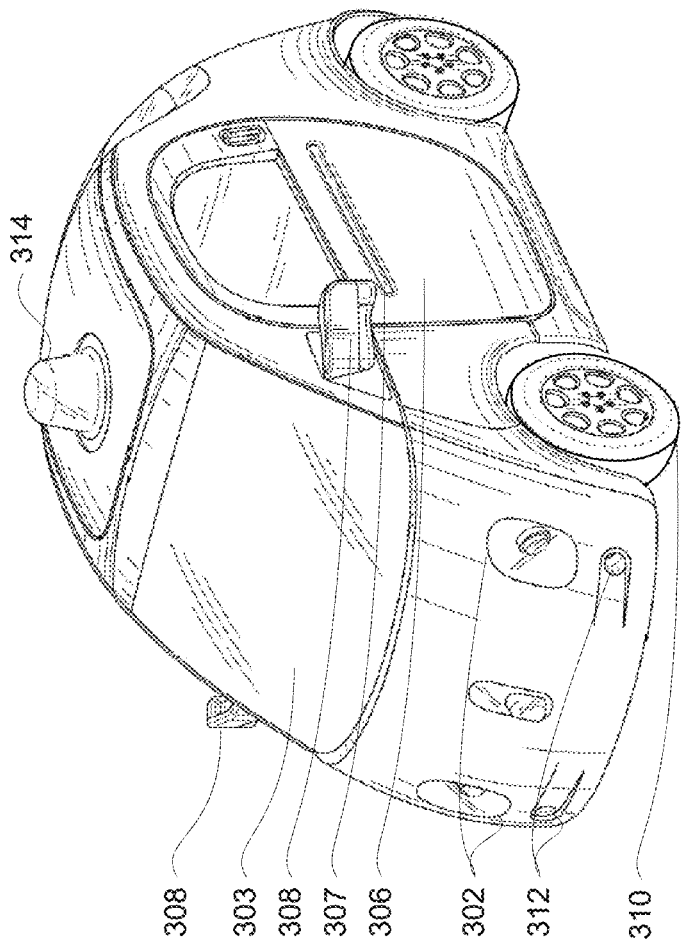
Figure 3D:
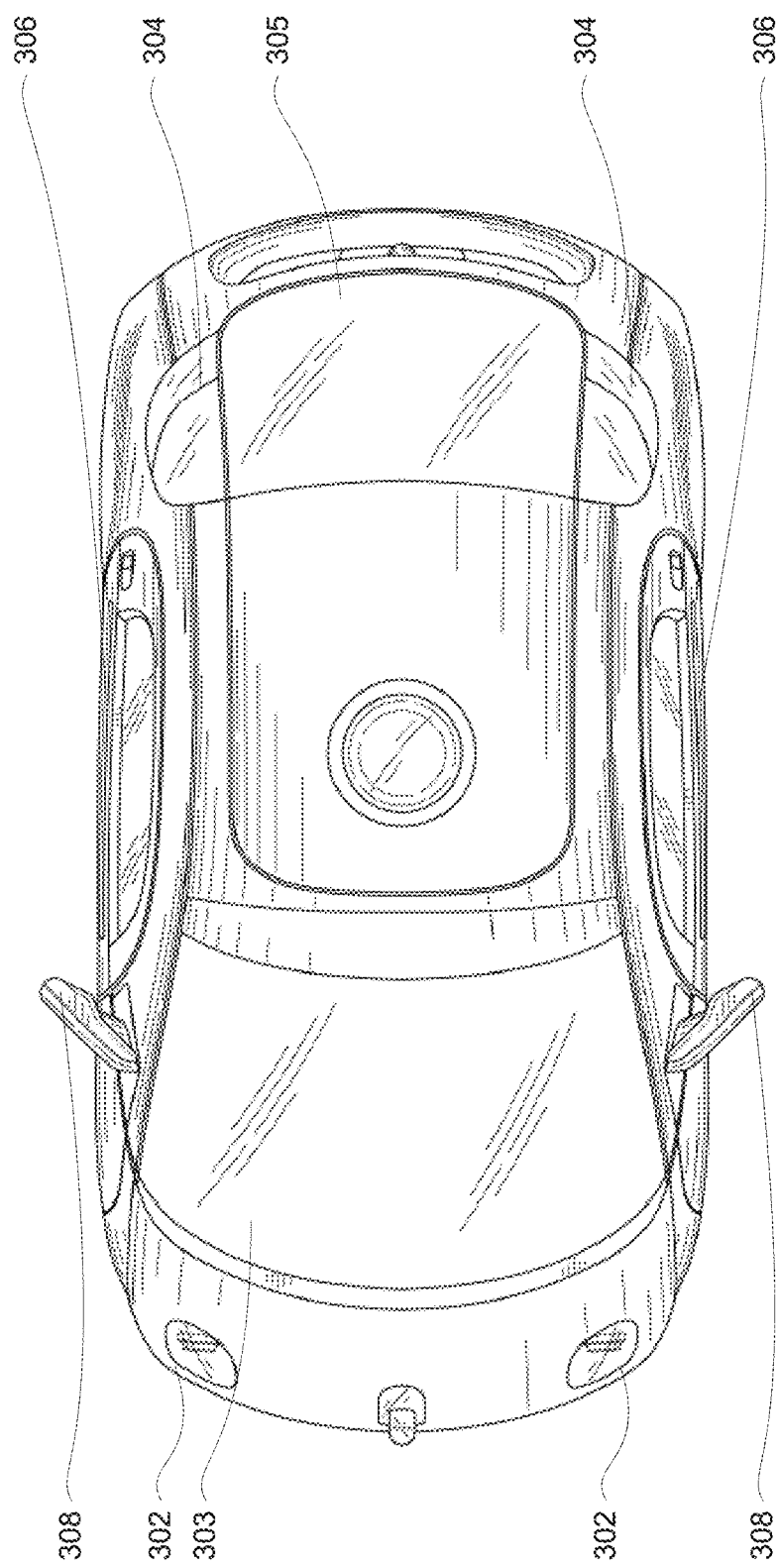

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways FIG. 2 is an example of map information 200 for a section of roadway. The map information 200 includes information identifying the shape, location, and other characteristics of various road features. In this example, the map information includes two lanes 210, 212 bounded by curb 220, lane lines 222 and curb 224. Lanes 210 has one direction of traffic flow (in an eastward direction), while lane 216 has an opposing traffic flow (in a westward direction). In addition, lanes 210 and 212 also include parking areas 230-238, for instance to allow for vehicles to park adjacent to curbs 220 or 224. Although the example of map information includes only a few road features, for instance, curbs, lane lines, and lanes, given the nature of the roadway, the map information 200 may also identify various other road features such as traffic signal lights, crosswalks, sidewalks, stop signs, yield signs, speed limit signs, road signs, etc. Although not shown, the detailed map information may also include information identifying speed limits and other legal traffic requirements as well as historical information identifying typical and historical traffic conditions at various dates and times.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record sensor data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent as sensor data for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Computing devices 110 may maneuver vehicle 100 to a destination location, for instance, to transport cargo and/or one or more passengers. In this regard, computing devices 110 may initiate the necessary systems to control the vehicle autonomously along a route to the destination location. For instance, the navigation system 168 may use the map information of data 134 to determine a route to the destination location using the map information 200. The computing devices 110 may then maneuver the vehicle autonomously (or in an autonomous driving mode) as described above along the route towards the destination.

Figure 4:
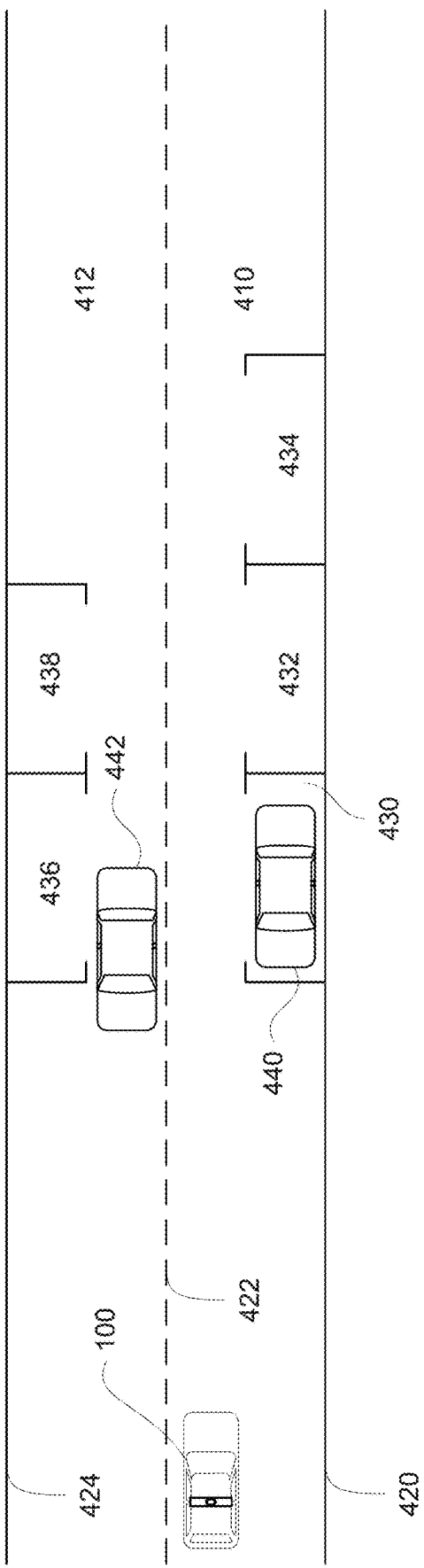
FIG. 4 is a view of a section of roadway in accordance with aspects of the disclosure.

FIG. 4 is an example view of vehicle 100 driving along a roadway 400 corresponding to map information 200 of FIG. 2. In that regard, lanes 410 and 412 correspond to the shape, location and traffic flow of lanes 210 and 212, respectively. Similarly, lane line 422 corresponds to the shape and location of lane line 222, and curbs 420, 424 correspond to the shape and location of curbs 220, 224, respectively. In this example, vehicle 100 is traveling east in lane 410.

As the vehicle moves along lane 410, the perception system 172 provides the computing devices with sensor data regarding the shapes and location of objects, such as curbs 420, 424, lane line 422, and the features of parking areas 430-438 with corresponding features of the map information as discussed above. In addition, the sensor data may also identify vehicles 440 and 442 as well as their characteristics, such as speed, location, heading, orientation, etc.

Figure 5:
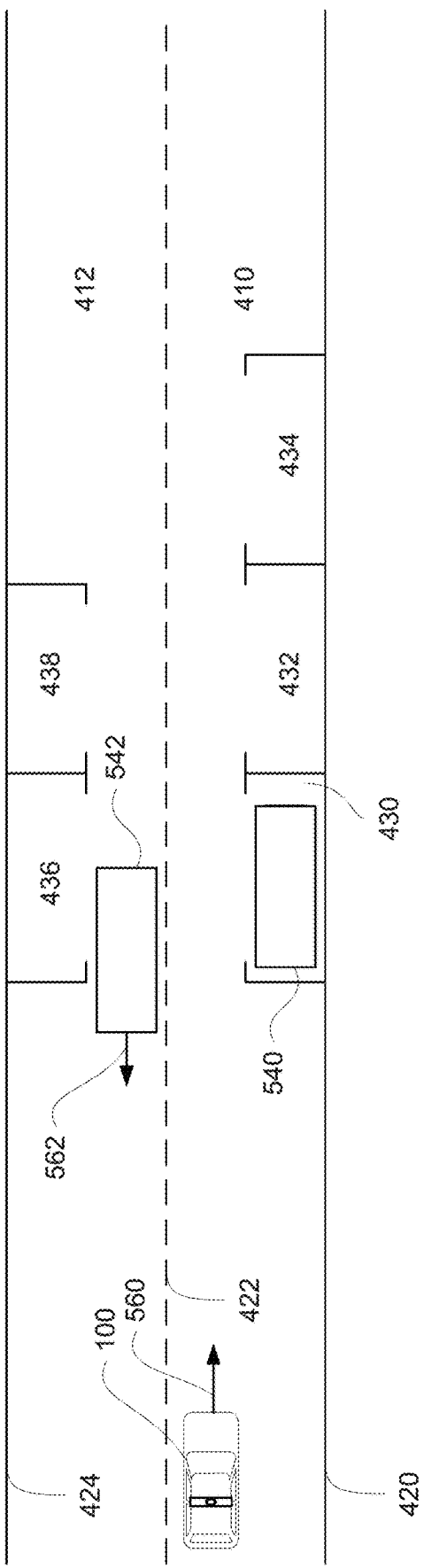
FIG. 5 is a view of a section of roadway and sensor data in accordance with aspects of the disclosure.

FIG. 5 depicts sensor data perceived by the various sensors of the perception system 172 when vehicle 100 is in the situation as depicted in FIG. 4 in combination with other information available to the computing devices 110. In this example, vehicles 440, 442 are represented by bounding boxes 540, 542 as provided by the perception system 172 to the computing devices 110. Of course, these bounding boxes represent merely a volume of space within which data points corresponding to an object are at least approximately bounded within. In addition, the actual heading of vehicle 100 and estimated heading of bounding box 542 (bounding box 540 representing a stationary object) are represented by arrows 560 and 562, respectively. As bounding boxes 540 appears to be moving very slowly or not at all, the computing devices 110 may determine that the object represented by this bounding box is stationary adjacent curb 420 in parking spot 430.

At this point, if vehicle continues in lane 410 on its current heading, the vehicle will pass (or be passed by) both the objects of bounding boxes 540 and 542 (or rather, vehicles 440 and 442). In order to allow vehicle 100 to proceed more slowly if an object is nearly in the path without requiring joint space-time planning, a speed dependent minimum lateral clearance to an object may be used.

Figure 6:
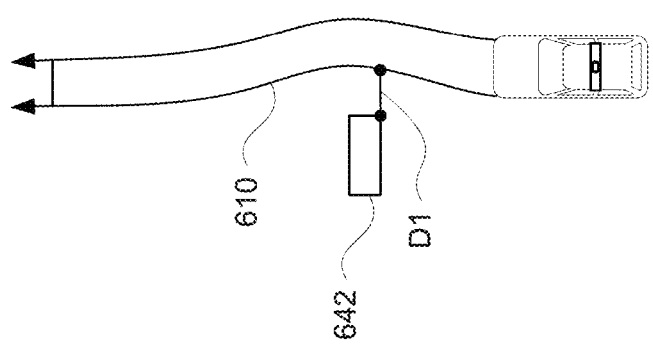
FIG. 6 is a diagram of example data in accordance with aspects of the disclosure.

A path of the trajectory which defines a geometry for the vehicle to follow in order following the route to the destination may be determined. In addition to following the route, the path may also allow the vehicle to avoid or pass objects detected by the perception system. Turning to FIG. 6, using the information about the movement of these bounding boxes, a path 610 may be generated which first curves to the right, moving vehicle 100 away from vehicle 442 during the period of time where vehicle 100 is passing by vehicle 442 (represented by area 642) and subsequently curves to the left, moving vehicle 100 away from vehicle 440 during the period of time where vehicle 100 is passing by vehicle 440 (represented by area 640). In this regard, area 642 represent time and space occupied by vehicle 442, if vehicle 442 remained at its current speed, heading, orientation, etc. D1 represents the minimum desired lateral clearance between vehicle 100 and vehicle 442.

In order to determine a speed plan for a given path, a maximum speed for passing a given object may be determined by using the function and inputting the minimum desired lateral clearance. For instance, using the minimum lateral clearance of 1 meter, a maximum speed may be determined for the speed plan. In other words, a maximum speed may be determined for passing vehicle 440 given that the minimum lateral clearance is 1 meter.

Figure 7:
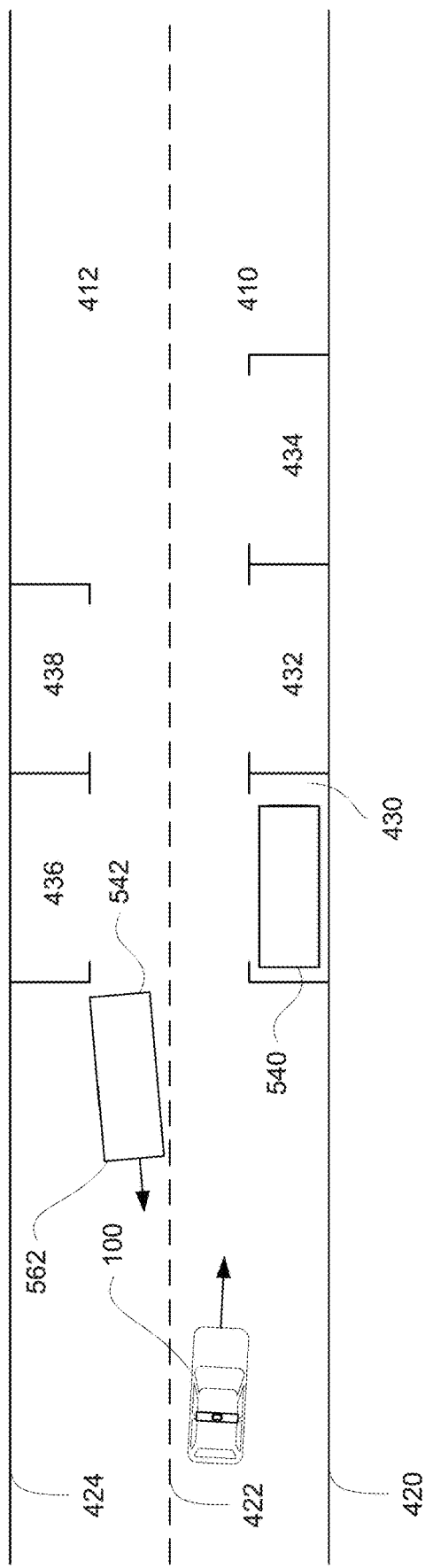
FIG. 7 is a view of a section of roadway and sensor data in accordance with aspects of the disclosure.
Figure 8:
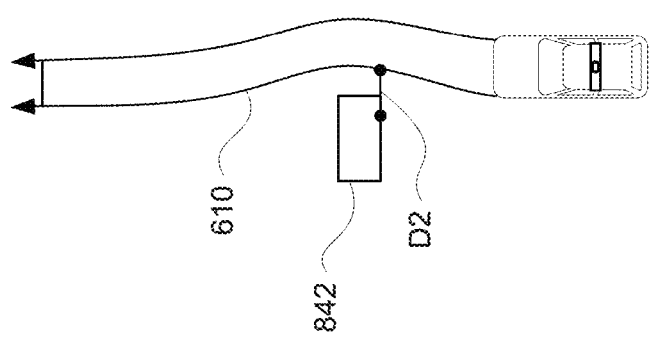
FIG. 8 is a diagram of example data in accordance with aspects of the disclosure.

Using that maximum speed, the computing devices 110 may determine an actual lateral clearance for the path. If the actual lateral clearance between the vehicle 100 and another object would be less than the desired minimum lateral clearance, the resulting speed plan will cause the vehicle yield or stop before violating the desired minimum lateral clearance. This may occur because there is only so much room within lane 410 or because the object or objects have moved as provided by updated sensor data from the perception system 172. For instance, if vehicle 442 moves towards vehicle 100 in the direction of lane line 422, as shown in FIG. 7, when vehicle 100 and vehicle 442 pass by one another, the actual lateral clearance, or D2 of FIG. 8, between vehicle 100 and vehicle 442 during the period of time where vehicle 100 is passing by vehicle 442 (represented by area 842) will be less than 1 meter or D1. As such, because the distance D2 is less than D1, the computing devices may generate speed plan will cause vehicle 100 to slow down, or rather, to move slower than the maximum speed in order to yield to the vehicle 442. The computing devices 110 may then control the vehicle 100 according to the path and the speed plan.

In the next iteration, a new trajectory with a new path and a new speed plan may be generated using updated sensor data from the perception system 172. The new path may be generated using updated sensor data from the perception system 172 in order to follow the route and avoid or pass any objects. If the vehicle was going to yield or stop in the previous iteration, a new maximum speed may be set to the minimum (or lowest) of the previous maximum speed and the vehicle's current speed. Alternatively, a threshold absolute minimum speed representing passing an object extremely slowly, such as 3 mph or more or less, may be used. The new maximum speed may then be used to determine a new speed plan for this iteration as discussed below.

Figure 9:
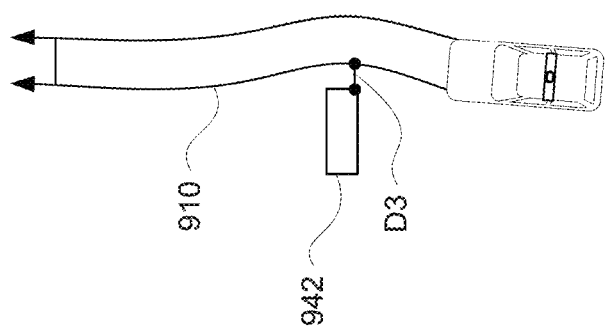
FIG. 9 is a diagram of example data in accordance with aspects of the disclosure.

In addition, function may then be used to determine a new desired minimum lateral clearance and new speed plan for the new path. To do so, the new maximum speed may be input into the function to determine the new desired minimum lateral clearance. Turning to FIG. 9, the computing devices 110 may generate a new path 910 using updated sensor data from the perception system 172 in order to follow the route and avoid or pass any objects. The computing devices 110 may use the new desired minimum lateral clearance D3 when determining a speed plan for passing by vehicle 440. Again in FIG. 9, area 942 represents a period of time and space where vehicle 100 is passing by vehicle 442. Thereafter, the computing devices 110 may generate a new speed plan for that new path by determining what the actual lateral clearance to vehicle 440 will be using the new maximum speed and updated sensor data from the perception system 172. Again, if the actual clearance is less than the new desired minimum lateral clearance, the resulting new speed plan generated by the computing devices 110 will cause the vehicle 100 to continue to slow down, such that the vehicle is able to yield or stop before violating the desired minimum lateral clearance. The computing devices 110 may then control the vehicle 100 in the autonomous driving mode according to the new path and the new speed plan.

In the next iteration, a new trajectory with a new path and a new speed plan may be generated using updated sensor data from the perception system 172. Again, a new path is generated using updated sensor data from the perception system 172 to avoid or pass the object and follow the route. If the vehicle was not going to yield or stop in the previous iteration but would be able to pass the object or rather, the actual clearance is greater than the previously required minimum lateral clearance plus some threshold value, the new maximum speed may be determined by increasing the previous maximum speed by a constant. For instance, if the actual clearance between vehicle 100 and vehicle 442 is at least some threshold greater than the minimum lateral clearance D3, such as 0.25 meters or more or less, the new maximum speed may be increased.

The constant may be selected based on noise properties of the perception system. For instance, if the estimation of other objects' extents has noise of +/− 10 cm (for example), preferably the speed would increase such that the required gap increases by <10 cm.

In addition, this constant may be selected such that when the new maximum speed is input into the function, the result is a new minimum lateral clearance that is less than the previously required minimum lateral clearance plus the threshold value. For instance, the new minimum lateral clearance would be less than D5 plus 0.25 meters.

The threshold value and constant chosen may influence how quick the vehicle is able to react to a changing situation as well as the smoothness of the vehicle's reaction. If the actual clearance greater than the previously required minimum lateral clearance, but not greater than the previously required minimum lateral clearance plus the threshold value, the vehicle may continue to use the previous maximum speed as the new maximum speed for this iteration.

The new desired minimum clearance for this iteration may then be determined using the function and the new maximum speed. A new path may be determined, again based on the route as well as updated sensor data from the perception system 172. Thereafter, a speed plan may be generated in using the new minimum desired lateral clearance. Again, if the actual clearance is less than the new desired minimum lateral clearance, the resulting speed plan will cause the vehicle yield or stop before violating the desired minimum lateral clearance.

The iterations may continue until the vehicle has passed the object. For instance, the iterations may continue until vehicle 100 has passed vehicle 442, and may begin again as the vehicle 100 approaches vehicle 440. However, as vehicle 440 is stationary and there are no other vehicles for the computing devices 100 to consider, there may only be 1 iteration. Although the above examples describe the iterations for passing the vehicles 440 and 442, this was merely for ease of understanding, as the computing devices 110 may generate a speed plan while considering the actual and minimum lateral clearance distances to multiple different objects at once.

The result of the aforementioned iterations is that when an object is close to the vehicle's path, the vehicle's computing devices will plan to stop the vehicle, thus slowing down until the vehicle's current speed is appropriate to pass an object given the actual clearance. At this point, the vehicle will continue at that speed unless there is an increase in actual clearance in which case the vehicle's computing devices can slightly and incrementally increase the vehicle's maximum speed using the iterations described above.

In addition, different functions may be used to determine minimum desired lateral clearance and maximum speeds for different types of objects. For example, it may be acceptable to come closer to other vehicles than pedestrians. Moreover, there may be additional granularity or different linear functions for subtypes of objects, such as adults versus children (never want to come too close to children), parked vehicles versus moving vehicles (want to be father from parked vehicles, since the door might open or undetected pedestrians may be nearby), etc.

The technology described herein may allow distinct geometry and velocity planners/optimizers to implement continuous, smooth, and safe reactions for a variety of objects without explicitly having to solve an overly-complicated space-time optimization problem. In other words, the vehicle is able to obtain reactions to dynamic and static objects in the environment that are spatially and temporally consistent. The vehicle is thus able to stop along a path if an object is in front of the vehicle, proceed if the object is sufficiently far away laterally from the path, and proceed more slowly if the object is nearly in the path, all without requiring a change in in the geometry for the path. In addition, the parameters specified for minimum clearances as a function of speed are extremely intuitive and easy tuned manually or via learning from corpuses of human driving data. In additional to the ease of specifying the speed/gap tradeoffs, this approach also provides simple and intuitive mechanisms for dealing with noise in perception data via the threshold and constants described herein, as they can be naturally derived from the aggregated statistical properties of the object measurement system.

Figure 10:
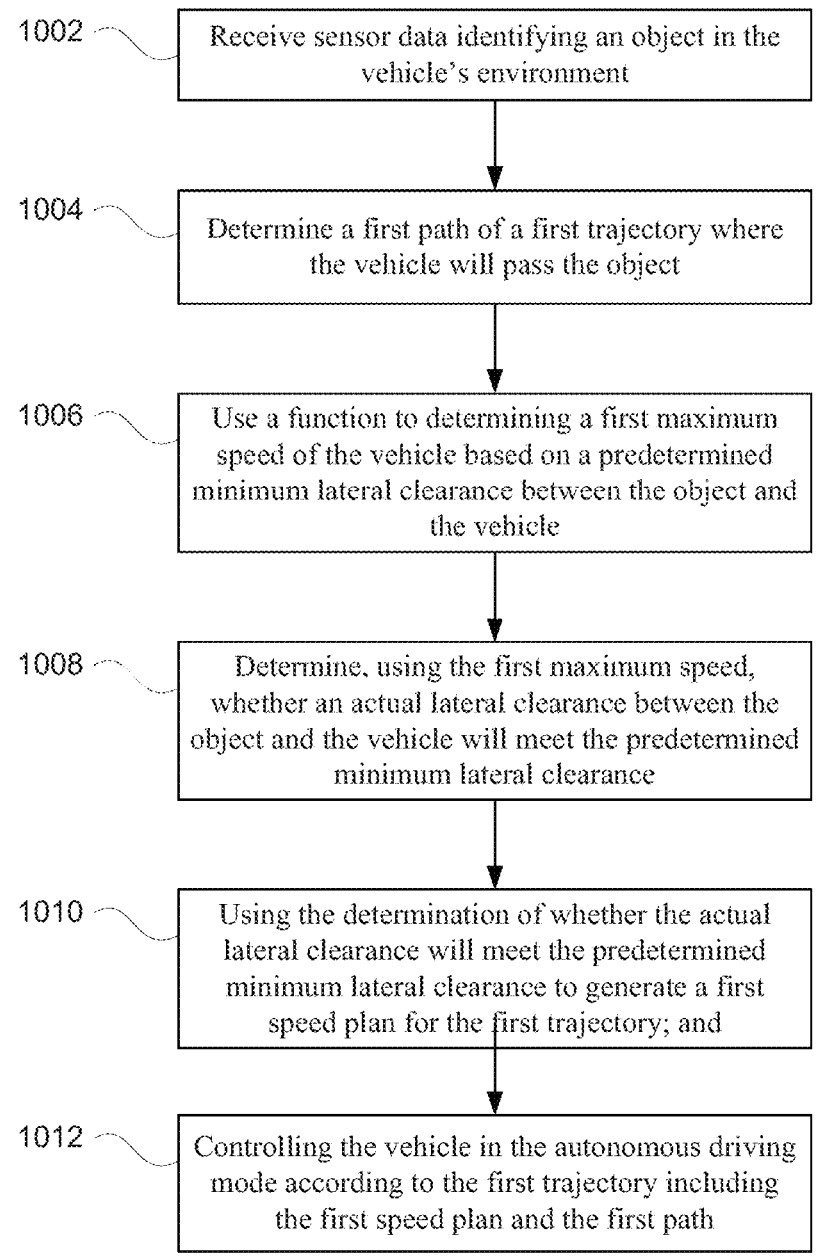
FIG. 10 is a flow diagram in accordance with aspects of the disclosure.

FIG. 10 is a flow diagram 1000 that may be performed by one or more processors, such as one or more processors 120 of computing devices 110 in order to control a vehicle in an autonomous driving mode. At block 1002, sensor data identifying an object in an environment of the vehicle is received. At block 1004, a first path of a first trajectory where the vehicle will pass the object is determined. At block 1006, a function is used to determining a first maximum speed of the vehicle based on a predetermined minimum lateral clearance between the object and the vehicle. At block 1008, the first maximum speed is used to determine whether an actual lateral clearance between the object and the vehicle will meet the predetermined minimum lateral clearance. At block 1010, the determination of whether the actual lateral clearance will meet the predetermined minimum lateral clearance is used to generate a first speed plan for the first trajectory. At block 1012, the vehicle is controlled in the autonomous driving mode according to the first trajectory including the first speed plan and the first path.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling a vehicle in an autonomous driving mode, the method comprising:
   determining, by one or more processors, a first path of a first trajectory where the vehicle will pass an object;
   in a first iteration when the vehicle is a first distance from the object, determining, by the one or more processors, a first speed plan for the first trajectory including a first maximum speed for the vehicle that will provide at least a first minimum lateral distance between the object and the vehicle, wherein the first speed plan includes a time and speed parameterization for causing the vehicle to yield or stop before meeting the first minimum lateral distance;
   controlling, by the one or more processors, the vehicle according to the first speed plan;
   determining, by the one or more processors, a second path of a second trajectory where the vehicle will pass the object;
   subsequent to controlling the vehicle according to the first speed plan, in a second iteration when the vehicle is a second distance from the object, determining a second speed plan for the second trajectory including a second maximum speed for the vehicle that will provide at least a second minimum lateral distance between the object and the vehicle, wherein the second minimum lateral distance is less than the first minimum lateral distance, wherein the second speed plan includes a time and speed parameterization for causing the vehicle to yield or stop before meeting the second minimum lateral distance, and the second maximum speed is set to one of the first maximum speed or a current speed of the vehicle; and
   controlling, by the one or more processors, the vehicle according to the second speed plan in the autonomous driving mode.

2. The method of claim 1, further comprising increasing the second maximum speed for the vehicle in response to the lateral distance between the object and the vehicle becoming greater than the second minimum lateral distance.

3. The method of claim 1, wherein the second maximum speed for the vehicle is less than the first maximum speed when the second minimum lateral distance between the object and the vehicle is less than the first minimum lateral distance between the object and the vehicle.

4. The method of claim 1, wherein determining the first speed plan includes using a function wherein maximum speed changes as minimum lateral distance between the object and the vehicle changes.

5. The method of claim 4, wherein sensor data further identifies a type of object, and the method further comprises selecting the function from a plurality of functions for different types of objects based on the type of object.

6. The method of claim 4, wherein the function is a linear function.

7. The method of claim 1, wherein determining the second speed plan is performed without joint space-time planning.

8. The method of claim 1, wherein the object is a person.

9. The method of claim 1, wherein the object is a parked vehicle.

10. The method of claim 1, wherein the object is a moving vehicle.

11. The method of claim 1, wherein the second maximum speed is set to a minimum of one of the first maximum speed and the current speed of the vehicle when the vehicle was going to yield or stop in response to the first speed plan.

12. A system of controlling a vehicle in an autonomous driving mode, the system comprising one or more processors configured to:
   determine a first path of a first trajectory where the vehicle will pass an object;
   in a first iteration when the vehicle is a first distance from the object, determine a first speed plan for the first trajectory including a first maximum speed for the vehicle that will provide at least a first minimum lateral distance between the object and the vehicle, wherein the first speed plan includes a time and speed parameterization for causing the vehicle to yield or stop before meeting the first minimum lateral distance;
   control the vehicle according to the first speed plan in the autonomous driving mode;
   determine a second path of a second trajectory where the vehicle will pass the object;
   subsequent to controlling the vehicle according to the first speed plan, in a second iteration when the vehicle is a second distance from the object, determine a second speed plan for the second trajectory including a second maximum speed for the vehicle that will provide at least a second minimum lateral distance between the object and the vehicle, wherein the second minimum lateral distance is less than the first minimum lateral distance, wherein the second speed plan includes a time and speed parameterization for causing the vehicle to yield or stop before meeting the second minimum lateral distance, and the second maximum speed is set to one of the first maximum speed or a current speed of the vehicle; and control the vehicle according to the second speed plan.

13. The system of claim 12, further comprising increasing the second maximum speed for the vehicle in response to the lateral distance between the object and the vehicle becoming greater than the second minimum lateral distance.

14. The system of claim 12, wherein the second maximum speed for the vehicle is less than the first maximum speed when the second minimum lateral distance between the object and the vehicle is less than the first minimum lateral distance between the object and the vehicle.

15. The system of claim 12, the one or more processors are further configured to select determine the first speed plan includes using a function wherein maximum speed changes as minimum lateral distance between the object and the vehicle changes.

16. The system of claim 15, wherein sensor data further identifies a type of object, and the one or more processors are further configured to select the function from a plurality of functions for different types of objects based on the type of object.

17. The system of claim 15, wherein the function is a linear function.

18. The system of claim 12, wherein the object is a person.

19. The system of claim 12, wherein the object is a parked vehicle.

20. The system of claim 12, wherein the object is a moving vehicle.

21. The system of claim 12, further comprising the vehicle.

22. The system of claim 12, wherein the second maximum speed is set to a minimum of the first maximum speed and the current speed of the vehicle when the vehicle was going to yield or stop in response to the first speed plan.

* * * * *